United States Patent [19]
Schmidt et al.

[11] Patent Number: 5,941,008
[45] Date of Patent: Aug. 24, 1999

[54] DECOY REEL ATTACHMENT

[76] Inventors: Chad Schmidt, 107 Jodie Kaye Ct., Brown County, Wrightstown, Wis. 54180; Paul Ludke, 6775 Benzenberg, Green Leaf, Wis. 54126

[21] Appl. No.: 09/226,258

[22] Filed: Jan. 7, 1999

[51] Int. Cl.[6] .................................................. A01M 31/06
[52] U.S. Cl. ......................................................... 43/2
[58] Field of Search .............................. 43/2, 3; 242/395, 242/397.1, 400, 402, 380

[56] References Cited

U.S. PATENT DOCUMENTS

| | | | |
|---|---|---|---|
| 2,608,361 | 8/1952 | Huebner | 43/2 |
| 2,855,717 | 10/1958 | Heil | 43/2 |
| 4,393,803 | 7/1983 | Donalies | 114/254 |
| 4,757,630 | 7/1988 | Torberg | 43/3 |
| 5,367,813 | 11/1994 | Cherry | 43/2 |
| 5,822,907 | 10/1998 | Lukey | 43/3 |

*Primary Examiner*—Thomas Price

[57] ABSTRACT

A decoy reel attachment for suspending a weight from a floating decoy to help keep the decoy upright in the water. The decoy reel attachment includes a casing with a base wall and a perimeter side wall extending around the base wall of the casing to define an interior space of the casing. A spool is rotatably mounted in the interior space of the casing. A holding sleeve is outwardly extended from the perimeter side wall of the casing. A elongate flexible line is wrapped around the spool. The flexible line has an outer free end outwardly extending from the spool through a slot in the perimeter side wall into the lumen of the holding sleeve. The outer free end of the flexible line is coupled to a weight that is insertable into the holding sleeve.

7 Claims, 2 Drawing Sheets

DECOY REEL ATTACHMENT

BACKGROUND OF THE INVENTION

1. Field of the Invention

The present invention relates to decoy reels and more particularly pertains to a new decoy reel attachment for suspending a weight from a floating decoy to help keep the decoy upright in the water.

2. Description of the Prior Art

The use of decoy reels is known in the prior art. More specifically, decoy reels heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,340,192; U.S. Pat. No. 1,789,649; U.S. Pat. No. 2,747,814; U.S. Pat. No. 4,826,099; U.S. Pat. No. 3,224,706; and U.S. Pat. No. Des. 359,898.

While these devices fulfill their respective, particular objectives and requirements, the aforementioned patents do not disclose a new decoy reel attachment. The inventive device includes a casing with a base wall and a perimeter side wall extending around the base wall of the casing to define an interior space of the casing. A spool is rotatably mounted in the interior space of the casing. A holding sleeve is outwardly extended from the perimeter side wall of the casing. A elongate flexible line is wrapped around the spool. The flexible line has an outer free end outwardly extending from the spool through a slot in the perimeter side wall into the lumen of the holding sleeve. The outer free end of the flexible line is coupled to a weight that is insertable into the holding sleeve.

In these respects, the decoy reel attachment according to the present invention substantially departs from the conventional concepts and designs of the prior art, and in so doing provides an apparatus primarily developed for the purpose of suspending a weight from a floating decoy to help keep the decoy upright in the water.

SUMMARY OF THE INVENTION

In view of the foregoing disadvantages inherent in the known types of decoy reels now present in the prior art, the present invention provides a new decoy reel attachment construction wherein the same can be utilized for suspending a weight from a floating decoy to help keep the decoy upright in the water.

The general purpose of the present invention, which will be described subsequently in greater detail, is to provide a new decoy reel attachment apparatus and method which has many of the advantages of the decoy reels mentioned heretofore and many novel features that result in a new decoy reel attachment which is not anticipated, rendered obvious, suggested, or even implied by any of the prior art decoy reels, either alone or in any combination thereof.

To attain this, the present invention generally comprises a casing with a base wall and a perimeter side wall extending around the base wall of the casing to define an interior space of the casing. A spool is rotatably mounted in the interior space of the casing. A holding sleeve is outwardly extended from the perimeter side wall of the casing. A elongate flexible line is wrapped around the spool. The flexible line has an outer free end outwardly extending from the spool through a slot in the perimeter side wall into the lumen of the holding sleeve. The outer free end of the flexible line is coupled to a weight that is insertable into the holding sleeve.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new decoy reel attachment apparatus and method which has many of the advantages of the decoy reels mentioned heretofore and many novel features that result in a new decoy reel attachment which is not anticipated, rendered obvious, suggested, or even implied by any of the prior art decoy reels, either alone or in any combination thereof.

It is another object of the present invention to provide a new decoy reel attachment which may be easily and efficiently manufactured and marketed.

It is a further object of the present invention to provide a new decoy reel attachment which is of a durable and reliable construction.

An even further object of the present invention is to provide a new decoy reel attachment which is susceptible of a low cost of manufacture with regard to both materials and labor, and which accordingly is then susceptible of low prices of sale to the consuming public, thereby making such decoy reel attachment economically available to the buying public.

Still yet another object of the present invention is to provide a new decoy reel attachment which provides in the apparatuses and methods of the prior art some of the advantages thereof, while simultaneously overcoming some of the disadvantages normally associated therewith.

Still another object of the present invention is to provide a new decoy reel attachment for suspending a weight from a floating decoy to help keep the decoy upright in the water.

Yet another object of the present invention is to provide a new decoy reel attachment which includes a casing with a base wall and a perimeter side wall extending around the base wall of the casing to define an interior space of the casing. A spool is rotatably mounted in the interior space of the casing. A holding sleeve is outwardly extended from the perimeter side wall of the casing. A elongate flexible line is wrapped around the spool. The flexible line has an outer free end outwardly extending from the spool through a slot in the perimeter side wall into the lumen of the holding sleeve. The outer free end of the flexible line is coupled to a weight that is insertable into the holding sleeve.

Still yet another object of the present invention is to provide a new decoy reel attachment that may also be used to anchor a decoy in the water.

Even still another object of the present invention is to provide a new decoy reel attachment that lets a user quickly and easily retract the line connecting the weight to the decoy without tangling the line.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
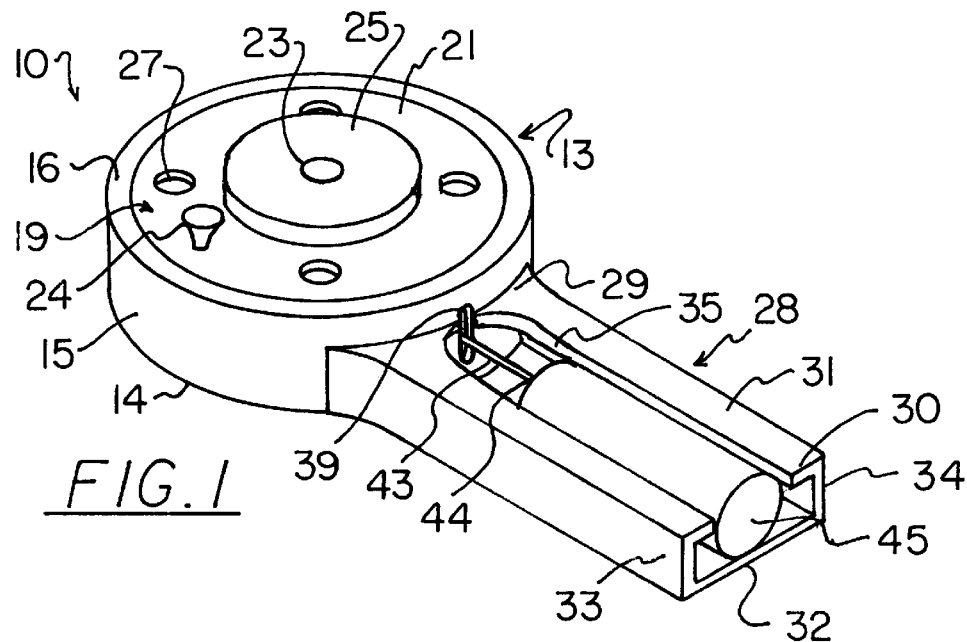
FIG. 1 is a schematic perspective view of a new decoy reel attachment according to the present invention.
Figure 2:
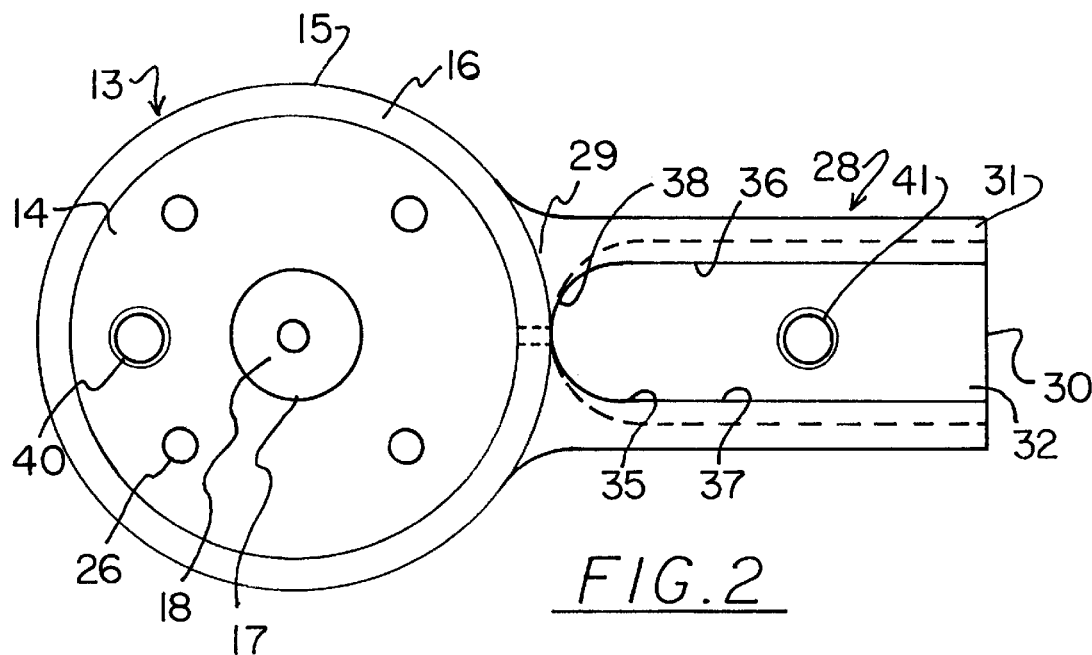
FIG. 2 is a schematic plan view of the casing and holding sleeve of the present invention.

With reference now to the drawings, and in particular to FIGS. 1 through 4 thereof, a new decoy reel attachment embodying the principles and concepts of the present invention and generally designated by the reference numeral 10 will be described.

As best illustrated in FIGS. 1 through 4, the decoy reel attachment 10 generally comprises a casing 13 with a base wall 14 and a perimeter side wall 15 extending around the base wall 14 of the casing 13 to define an interior space of the casing 13. A spool 19 is rotatably mounted in the interior space of the casing 13. A holding sleeve 28 is outwardly extended from the perimeter side wall 15 of the casing 13. A elongate flexible line 43 is wrapped around the spool 19. The flexible line 43 has an outer free end 44 outwardly extending from the spool 19 through a slot in the perimeter side wall 15 into the lumen of the holding sleeve 28. The outer free end 44 of the flexible line 43 is coupled to a weight 45 that is insertable into the holding sleeve 28.

In closer detail, the reel attachment 10 is designed for attachment to a bottom 12 of a floating game decoy 11 shaped to resemble a water fowl animal. The reel attachment helps keep the game decoy 11 upright floating on the water and also may be used as an anchoring device for permitting anchoring of the game decoy 11 when in the water. Specifically, the reel attachment 10 comprises a generally cylindrical casing 13 having a generally circular base wall 14 and a generally cylindrical perimeter side wall 15 extending around the base wall 14 of the casing 13. The base wall 14 and the perimeter side wall 15 of the casing 13 define an interior space of the casing 13. The perimeter side wall 15 of the casing 13 terminates at an annular free edge 16 defining a generally circular opening into the interior space of the casing 13. The base wall 14 of the casing 13 has a centrally positioned generally cylindrical hub 17 extending into the interior space of the casing 13. The hub 17 terminates at a generally circular outer face 18. Preferably, the outer face 18 of the hub 17 is positioned between the free edge 16 of the perimeter side wall 15 and the base wall 14 of the casing 13. Ideally, the outer face 18 of the hub 17 and the free edge 16 of the perimeter side wall 15 lie in generally parallel planes to one another.

A spool 19 is rotatably mounted in the interior space of the casing 13. The spool 19 has a spaced apart pair of outer disks 20,21 and a generally cylindrical tubular central shaft 22 extending between the outer disks of the spool 19. The outer disks 20,21 of the spool 19 preferably lie in substantially parallel planes to one another. A first of the outer disks 20 of the spool 19 has a generally circular hole into the lumen of the central shaft of the spool 19. The hub 17 is inserted into the central shaft through the hole of the first outer disk 20 to permit free rotation of the spool 19 about the hub 17 in the interior space of the casing 13. Preferably, a threaded fastener 23 is extended through a washer 25 and a second of the outer disks 21 into the central shaft and into the hub 17 to couple the spool 19 to the hub 17 while still permitting free rotation of the spool 19 about the hub 17. The first outer disk 20 is positioned adjacent the base wall 14 in the interior space of the casing 13. The second of the outer disks and the free edge 16 of the perimeter side wall 15 of the casing 13 ideally generally lie in a common plane with one another.

Preferably, the base wall 14 of the casing 13 has a plurality of generally circular drain apertures 26 therethrough designed for permitting water to drain out of the interior space of the casing 13. The drain apertures 26 of the base wall 14 are ideally generally equally spaced apart around the hub 17. Each of the outer disks of the spool 19 also preferably has a plurality of drain apertures 27 therethrough. Each drain aperture of one of the outer disks is associated with a drain aperture of the other outer disk. The drain apertures of each associated pair of drain apertures of the outer disks are preferably generally coaxially aligned with one another. In use, the spool 19 is rotatable about the hub 17 to permit coaxial alignment of each pair of associated drain apertures of the outer disks with the drain aperture of the base wall of the casing to permit water to flow freely out of the casing when the drain apertures are so aligned.

The second outer disk 21 of the spool 19 has an offset handle 24 coupled thereto to permit rotation of the spool 19 by turning the handle 24.

The holding sleeve 28 is outwardly extended from the perimeter side wall 15 of the casing 13 in a generally radial direction. The holding sleeve 28 has a lumen, a proximal end 29, an open distal end 30, and a longitudinal axis extending between the proximal and distal ends 29,30 of the holding sleeve 28. The proximal end 29 of the holding sleeve 28 is coupled to the perimeter side wall 15 of the casing 13 such that the distal end 30 of the holding sleeve 28 outwardly extends from the perimeter side wall 15 of the casing 13.

In an ideal embodiment, the holding sleeve 28 has a generally rectangular transverse cross section substantially perpendicular to the longitudinal axis of the holding sleeve 28. The rectangular configuration of the holding sleeve 28 defines generally rectangular first, second, third and fourth side walls 31,32,33,34. The first and second side walls 31,32 of the holding sleeve 28 are spaced apart and lie in generally parallel planes to one another. The third and fourth side walls 33,34 of the holding sleeve 28 are spaced apart and lying in generally parallel planes to one another generally perpendicular to the planes of the first and second side walls 31,32 of the holding sleeve 28.

The first side wall 31 of the holding sleeve 28 has an elongate cutout 35 therethrough extending from the distal end 30 of the holding sleeve 28 towards the proximal end 29 of the holding sleeve 28. Preferably, the cutout 35 has a generally U-shaped periphery with a pair of generally straight parallel side portions 36,37 and an arcuate portion 38 connecting the side portions 36,37 together. The arcuate portion 38 of the periphery of cutout 35 is positioned adjacent the proximal end 29 of the holding sleeve 28. The side portions 36,37 of the periphery of cutout 35 are preferably extended generally parallel to the third and fourth side walls 33,34 and the longitudinal axis of the holding sleeve 28.

Figure 3:
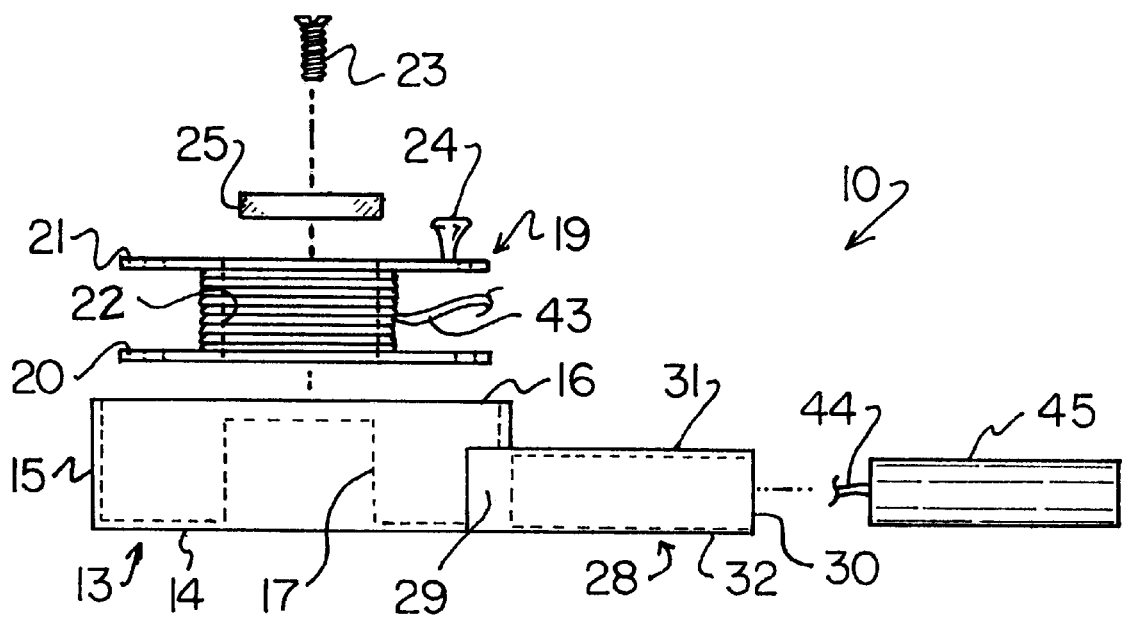
FIG. 3 is a schematic exploded side view of the present invention.
Figure 4:
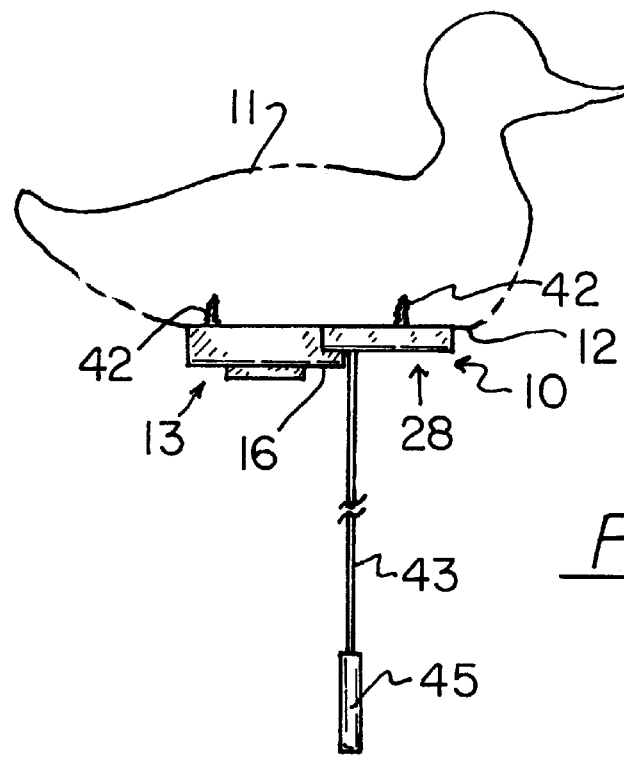
FIG. 4 is a schematic side view of the present invention in use attached to the bottom of a game decoy.

As illustrated in FIG. 3, the second side wall 32 and the base wall 14 ideally generally lying in a common plane with one another. The base wall 14 and the second side wall 32 are designed for attachment to a bottom 12 of a game decoy 11 as illustrated in FIG. 4. The base wall 14 and the second side wall 32 each preferably has a threaded securing hole 40,41 therethrough each designed for extending a threaded fastener 42 therethrough to threadably fasten the base wall 14 and the second side wall 32 to the bottom 12 of the game decoy 11.

The elongate flexible line 43 is wrapped around the central shaft 22 of the spool 19. The flexible line 43 has an outer free end 44 outwardly extending from the central shaft of the spool 19. The perimeter side wall 15 has a 39 slot therethrough providing an opening between the interior space of the casing 13 and the lumen of the holding sleeve 28. The outer free end 44 of the flexible line 43 is extended through the slot 39 of the perimeter side wall 15 into the lumen of the holding sleeve 28. A weight 45 is disposed in the lumen of the holding sleeve 28 so that the weight 45 may be removed from the lumen of the holding sleeve 28 through the distal end 30 of the housing. The outer free end 44 of the flexible line 43 is coupled to the weight 45.

With reference to FIG. 4, in use, when the reel attachment is attached to the bottom 12 of the game decoy 11, the flexible line 43 may be unwound from the spool 19 to let the weight 45 hang down from the reel attachment. The weight 45 helps keep the game decoy 11 upright in the water. The flexible line 43 may be wound around the spool 19 to retract the weight 45 back into the holding sleeve 28 when not in use.

In an ideal illustrative embodiment the casing 13 has a height defined between the base wall 14 and the free edge 16 of the perimeter side wall 15 of about 1 inch. In this ideal illustrative embodiment, the base wall 14 as a diameter of the about 2 ¼ inches. The holding sleeve 28 has a length defined between the ends of the holding sleeve 28 of about 1 ½ inches and a width between the third and fourth side walls of about 0.875 inches in this ideal illustrative embodiment.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A reel attachment for attachment to a bottom of a floating game decoy, said reel attachment comprising:

a casing having a base wall and a perimeter side wall extending around said base wall of said casing, said base wall and said perimeter side wall of said casing defining an interior space of said casing;

a spool being rotatably mounted in said interior space of said casing;

a holding sleeve being outwardly extended from said perimeter side wall of said casing;

said holding sleeve having a lumen, a proximal end, an open distal end, and a longitudinal axis extending between said proximal and distal ends of said holding sleeve;

said proximal end of said holding sleeve being coupled to said perimeter side wall of said casing;

an elongate flexible line being wrapped around said spool, said flexible line having an outer free end outwardly extending from said spool;

said perimeter side wall having a slot through providing an opening between said interior space of said casing and said lumen of said holding sleeve;

said outer free end of said flexible line being extended through said slot of said perimeter side wall into said lumen of said holding sleeve;

a weight being disposed in said lumen of said holding sleeve; and said outer free end of said flexible line being coupled to said weight.

2. The reel attachment of claim 1, wherein said base wall of said casing has a centrally positioned generally cylindrical hub extending into said interior space of said casing, wherein said spool has a spaced apart pair of outer disks and a tubular central shaft extending between said outer disks of said spool, a first of said outer disks of said spool having a hole into said central shaft of said spool, said hub being inserted into said central shaft through said hole of said first outer disk to permit free rotation of said spool about said hub in said interior space of said casing.

3. The reel attachment of claim 1, wherein said base wall of said casing has a plurality of generally circular drain apertures therethrough.

4. The reel attachment of claim 1, wherein said holding sleeve has an elongate cutout therethrough extending from said distal end of said holding sleeve towards said proximal end of said holding sleeve.

5. The reel attachment of claim 4, wherein said cutout of said first side wall of said holding sleeve has a generally U-shaped periphery having a pair of generally straight side portions and an arcuate portion connecting said side portions together, said arcuate portion of said periphery of cutout being positioned adjacent said proximal end of said holding sleeve, said side portions of said periphery of cutout being extended generally parallel to said longitudinal axis of said holding sleeve.

6. A reel attachment for attachment to a bottom of a floating game decoy, said reel attachment comprising:

a generally cylindrical casing having a generally circular base wall and a generally cylindrical perimeter side wall extending around said base wall of said casing, said base wall and said perimeter side wall of said casing defining an interior space of said casing;

said perimeter side wall of said casing terminating at an annular free edge defining a generally circular opening into said interior space of said casing;

said base wall of said casing having a centrally positioned generally cylindrical hub extending into said interior space of said casing;

said hub terminating at a generally circular outer face, said outer face of said hub being positioned between said free edge of said perimeter side wall and said base wall of said casing, said outer face of said hub and said free edge of said perimeter side wall lying in generally parallel planes to one another;

a spool being rotatably mounted in said interior space of said casing;

said spool having a spaced apart pair of outer disks and a generally cylindrical tubular central shaft extending between said outer disks of said spool;

said outer disks of said spool lying in substantially parallel planes to one another;

a first of said outer disks of said spool having a generally circular hole into said central shaft of said spool;

said hub being inserted into said central shaft through said hole of said first outer disk to permit free rotation of said spool about said hub in said interior space of said casing;

a second of said outer disks of said spool having an offset handle coupled thereto;

said first outer disk being positioned adjacent said base wall in said interior space of said casing;

said second of said outer disks and said free edge of said perimeter side wall of said casing generally lying in a common plane with one another;

said base wall of said casing having a plurality of generally circular drain apertures therethrough, said drain apertures of said base wall being generally equally spaced apart around said hub;

each of said outer disks of said spool having a plurality of drain apertures therethrough, each drain aperture of one of said outer disks being associated with a drain aperture of the other outer disk, each associated pair of drain apertures of said outer disks being generally coaxially aligned with one another;

said spool being rotatable about said hub to permit coaxial alignment of each pair of associated drain apertures of said outer disks with said drain apertures of said base wall of said casing;

a holding sleeve being outwardly extended from said perimeter side wall of said casing in a generally radial direction;

said holding sleeve having a lumen, a proximal end, an open distal end, and a longitudinal axis extending between said proximal and distal ends of said holding sleeve;

said proximal end of said holding sleeve being coupled to said perimeter side wall of said casing;

said holding sleeve having a generally rectangular transverse cross section substantially perpendicular to said longitudinal axis of said holding sleeve;

having generally rectangular first, second, third and four side walls, said first and second side walls of said holding sleeve being spaced apart and lying in generally parallel planes to one another, said third and fourth side walls of said holding sleeve being spaced apart and lying in generally parallel planes to one another generally perpendicular to said planes of said first and second side walls of said holding sleeve;

said first side wall of said holding sleeve having an elongate cutout therethrough extending from said distal end of said holding sleeve towards said proximal end of said holding sleeve;

said cutout of said first side wall of said holding sleeve having a generally U-shaped periphery having a pair of generally straight side portions and an arcuate portion connecting said side portions together;

said arcuate portion of said periphery of cutout being positioned adjacent said proximal end of said holding sleeve;

said side portions of said periphery of cutout being extended generally parallel to said third and fourth side walls and said longitudinal axis of said holding sleeve;

said second side wall of said holding sleeve and said base wall of said casing generally lying in a common plane with one another;

said base wall of said casing and said second side wall of said holding sleeve being adapted for attachment to a bottom of a game decoy;

said base wall of said casing and said second side wall of said holding sleeve each having a threaded securing hole therethrough each adapted for extending a threaded fastener therethrough to threadably fasten said base wall and said second side wall to the bottom of the game decoy;

an elongate flexible line being wrapped around said central shaft of said spool, said flexible line having an outer free end outwardly extending from said central shaft of said spool;

said perimeter side wall having a slot through providing an opening between said interior space of said casing and said lumen of said holding sleeve;

said outer free end of said flexible line being extended through said slot of said perimeter side wall into said lumen of said holding sleeve;

a weight being disposed in said lumen of said holding sleeve, said weight being removable from said lumen of said holding sleeve through said distal end of said housing; and said outer free end of said flexible line being coupled to said weight.

7. In combination:

a game decoy having a bottom;

a casing having a base wall and a perimeter side wall extending around said base wall of said casing, said base wall and said perimeter side wall of said casing defining an interior space of said casing;

a spool being rotatably mounted in said interior space of said casing;

a holding sleeve being outwardly extended from said perimeter side wall of said casing;

said holding sleeve having a lumen, a proximal end, an open distal end, and a longitudinal axis extending between said proximal and distal ends of said holding sleeve;

said proximal end of said holding sleeve being coupled to said perimeter side wall of said casing;

said holding sleeve and said casing being coupled to said bottom of said game decoy;

an elongate flexible line being wrapped around said spool, said flexible line having an outer free end outwardly extending from said spool;

said perimeter side wall having a slot through providing an opening between said interior space of said casing and said lumen of said holding sleeve;

said outer free end of said flexible line being extended through said slot of said perimeter side wall into said lumen of said holding sleeve;

a weight being disposed in said lumen of said holding sleeve; and said outer free end of said flexible line being coupled to said weight.

* * * * *